(12) United States Patent
Kim

(10) Patent No.: US 12,283,859 B2
(45) Date of Patent: Apr. 22, 2025

(54) MOTOR HAVING INSULATOR ON WHICH TERMINALS ARE SEATED

(71) Applicant: LG INNOTEK CO., LTD., Seoul (KR)

(72) Inventor: Seong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 258 days.

(21) Appl. No.: 17/791,297

(22) PCT Filed: Dec. 23, 2020

(86) PCT No.: PCT/KR2020/018995
§ 371 (c)(1),
(2) Date: Jul. 7, 2022

(87) PCT Pub. No.: WO2021/141299
PCT Pub. Date: Jul. 15, 2021

(65) Prior Publication Data
US 2023/0031486 A1  Feb. 2, 2023

(30) Foreign Application Priority Data
Jan. 8, 2020 (KR) .......................... 10-2020-0002746

(51) Int. Cl.
*H02K 3/34* (2006.01)
*H02K 5/22* (2006.01)

(52) U.S. Cl.
CPC ............. *H02K 3/345* (2013.01); *H02K 5/225* (2013.01)

(58) Field of Classification Search
None
See application file for complete search history.

(56) References Cited

U.S. PATENT DOCUMENTS

| 8,847,457 B2 * | 9/2014 | Yoshida ................. H02K 3/522 310/194 |
| 9,024,500 B2 * | 5/2015 | Kimura ................... F01D 25/08 310/194 |
| 2009/0102310 A1 | 4/2009 | Amano |

(Continued)

FOREIGN PATENT DOCUMENTS

| KR | 10-1526072 | 6/2015 |
| KR | 10-1911723 | 10/2018 |
| KR | 10-2019-0121095 | 10/2019 |

OTHER PUBLICATIONS

International Search Report dated Apr. 12, 2021 issued in Application No. PCT/KR2020/018995.

*Primary Examiner* — Bernard Rojas
(74) *Attorney, Agent, or Firm* — KED & Associates LLP

(57) ABSTRACT

The present invention may provide a motor including a stator core, an insulator coupled to the stator core, and a first terminal and a second terminal which are coupled to the insulator, wherein the stator core includes a yoke and a tooth protruding from the yoke, the insulator includes a body on which the tooth is disposed and a seating part extending from the body and disposed on the yoke, the seating part include a base and first to third partition walls extending from the base, the first terminal is disposed between the first partition wall and the second partition wall, and the second terminal is disposed between the second partition wall and the third partition wall.

8 Claims, 14 Drawing Sheets

(56) References Cited

U.S. PATENT DOCUMENTS

2013/0115064 A1    5/2013  Kimura et al.
2016/0365764 A1*  12/2016  Hung ...................... H02K 3/18
2019/0006963 A1*   1/2019  Isaji ..................... H02K 15/095
2019/0319506 A1*  10/2019  Reu ....................... H02K 1/146

* cited by examiner

[FIG. 1]
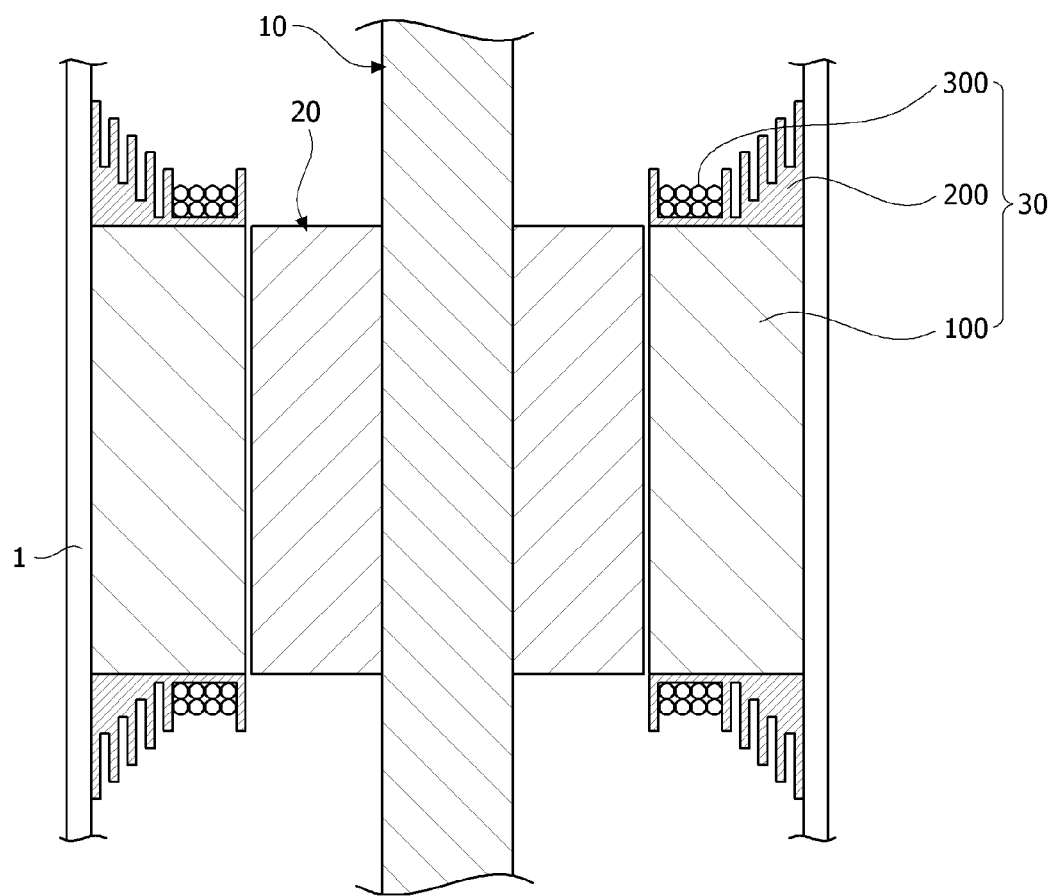

[FIG. 2]
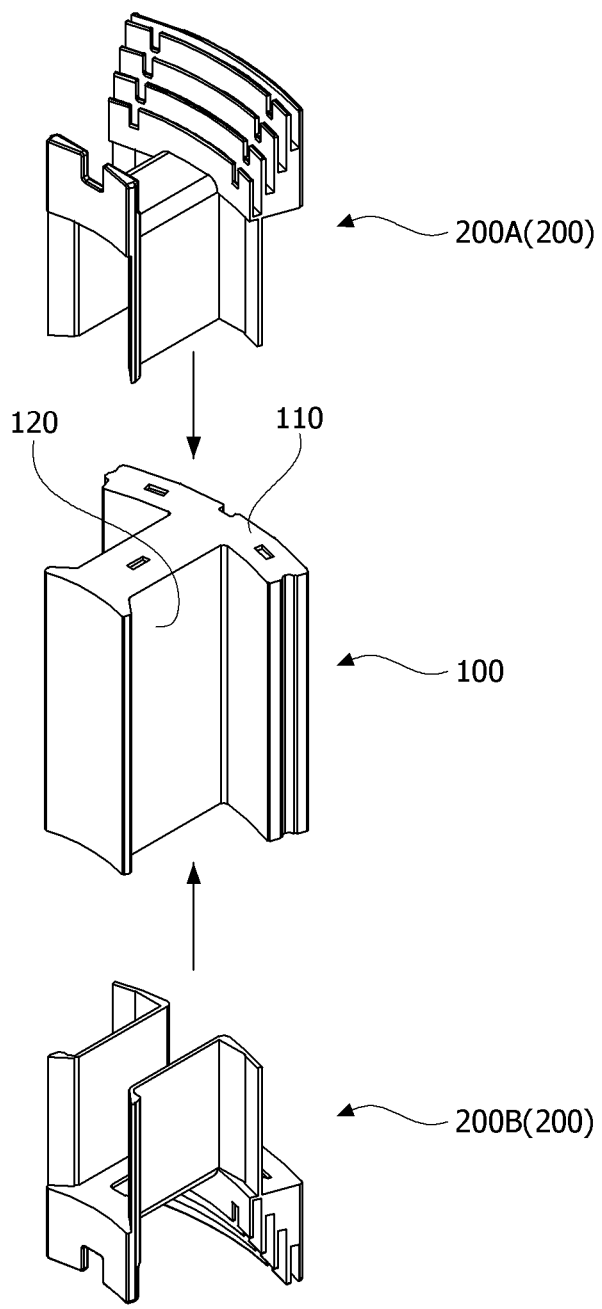

[FIG. 3]
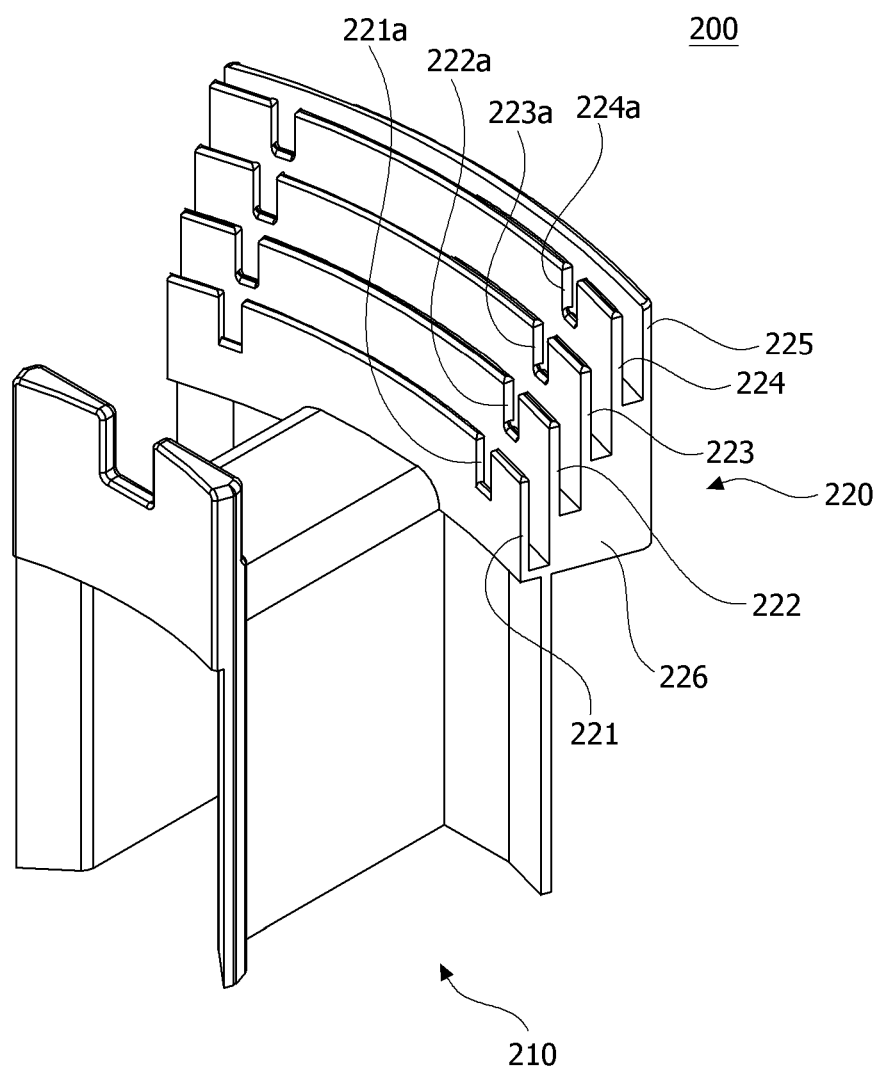

[FIG. 4]
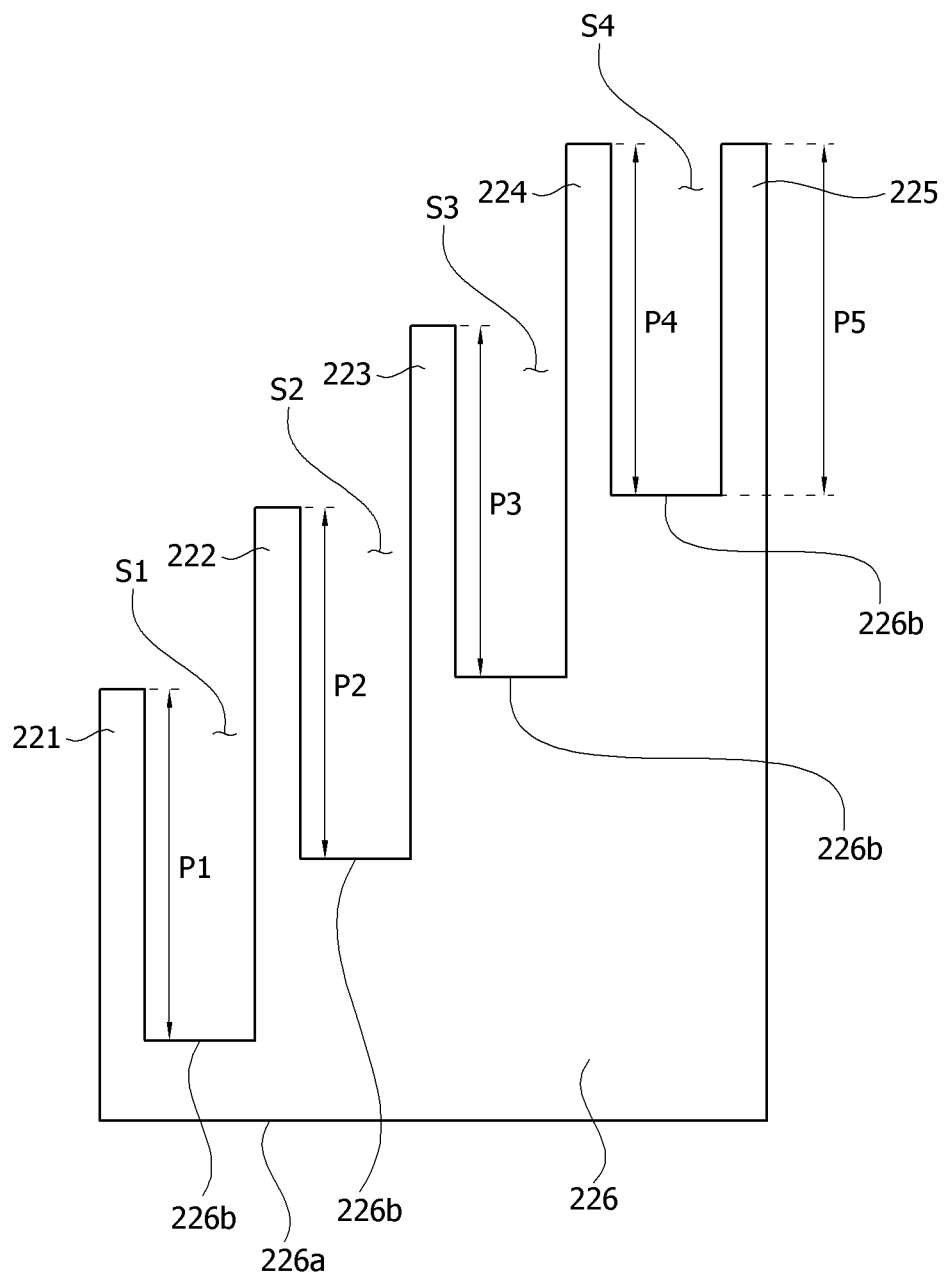

[FIG. 5]
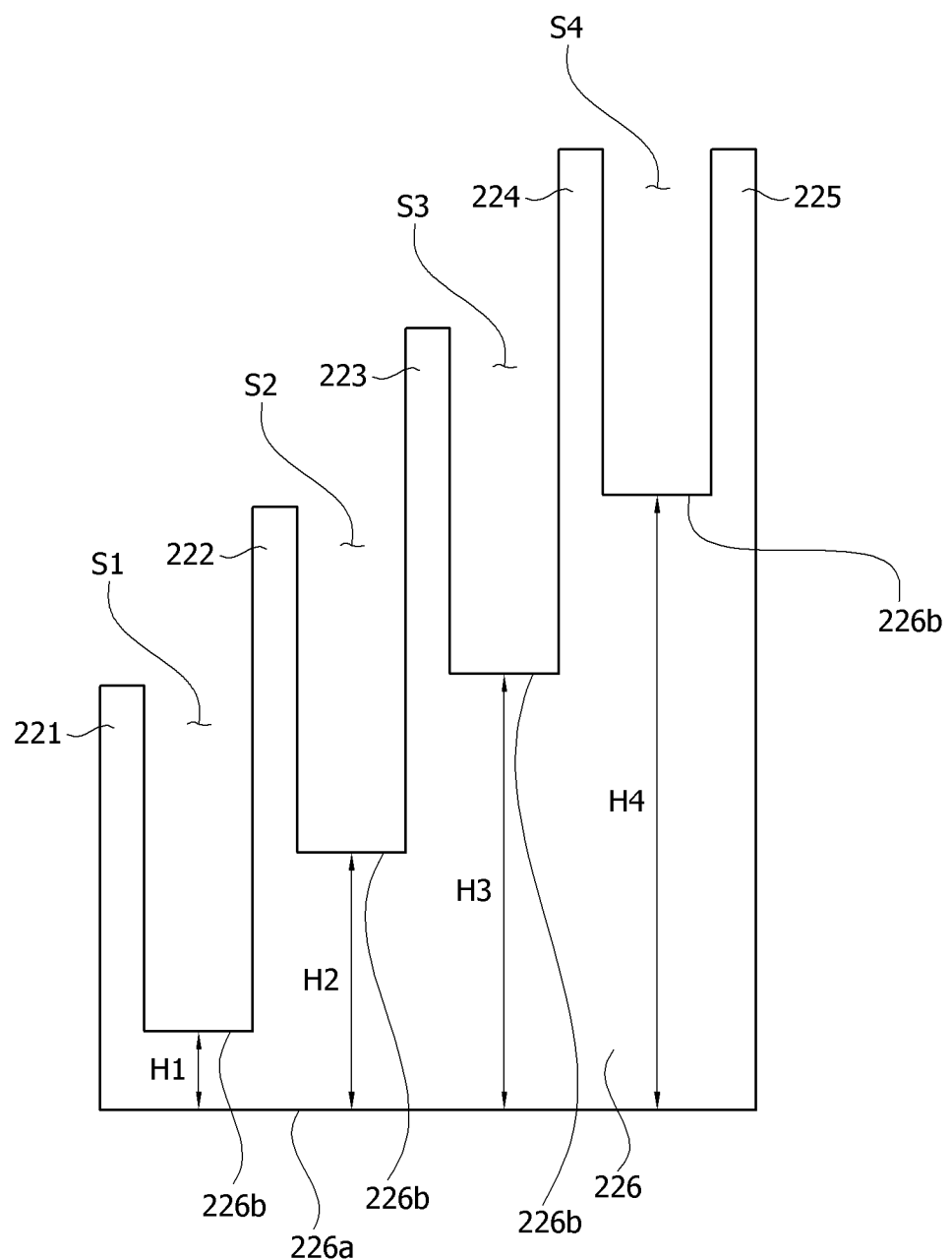

[FIG. 6]
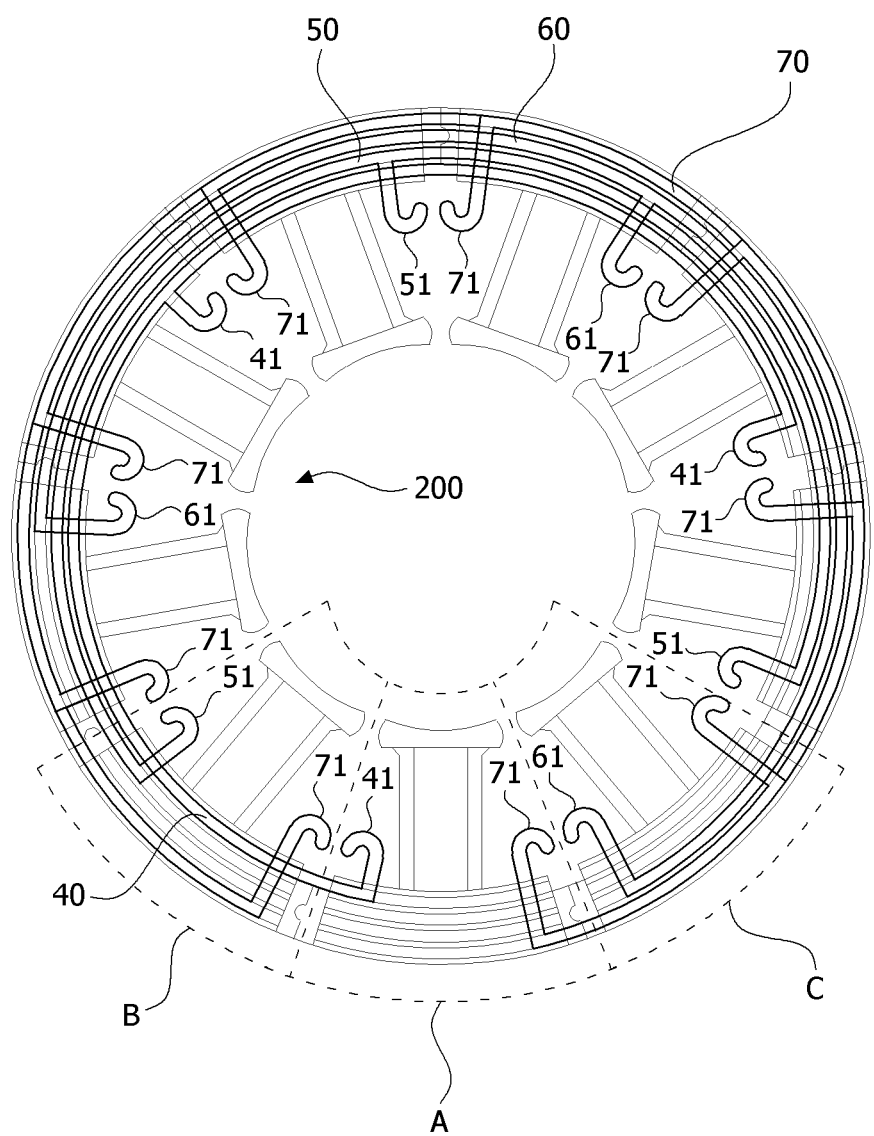

[FIG. 7]
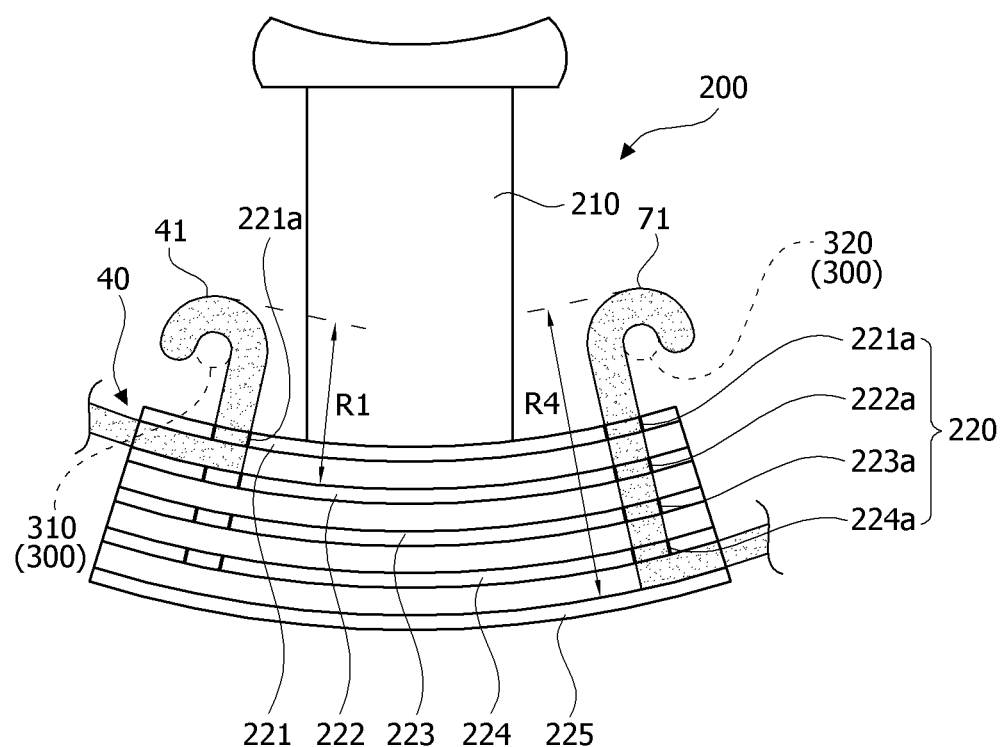

[FIG. 8]
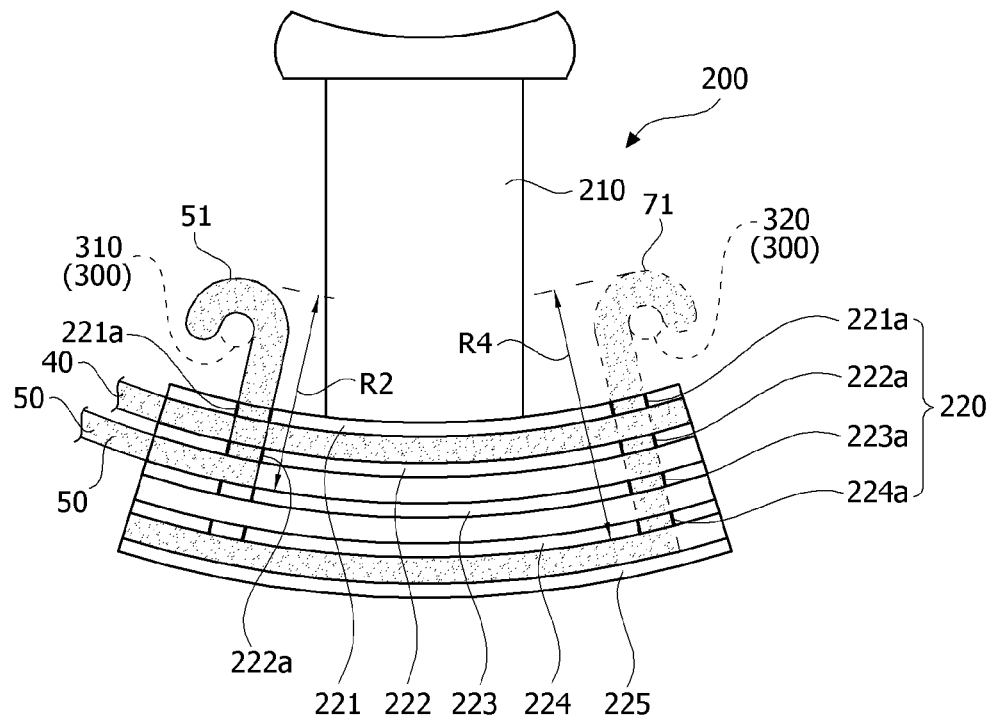

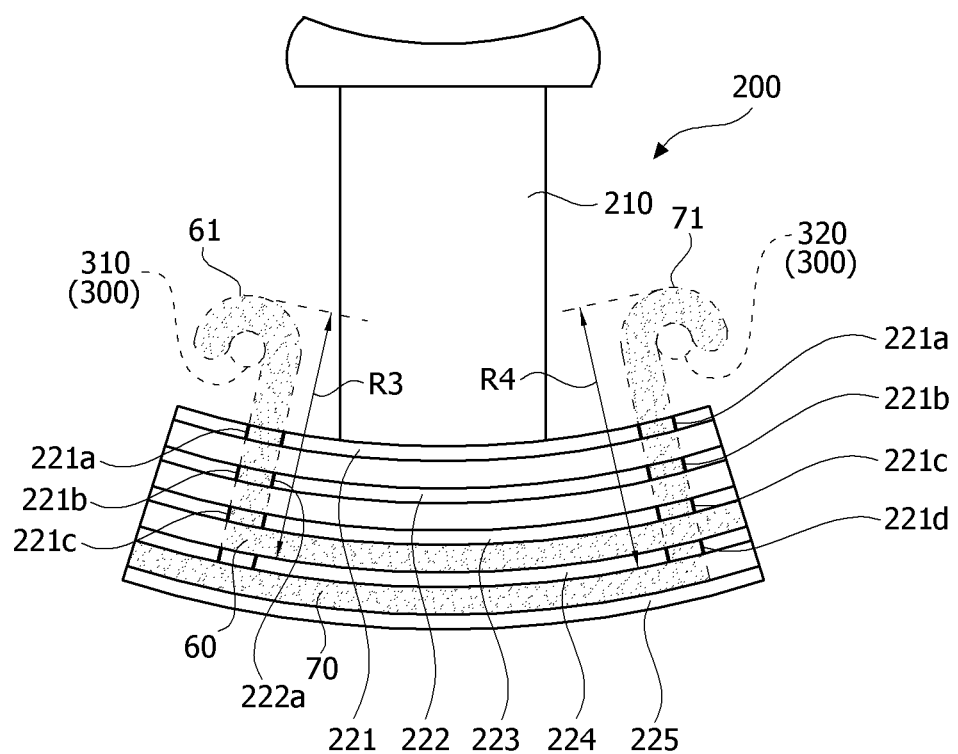
[FIG. 9]

[FIG. 10]
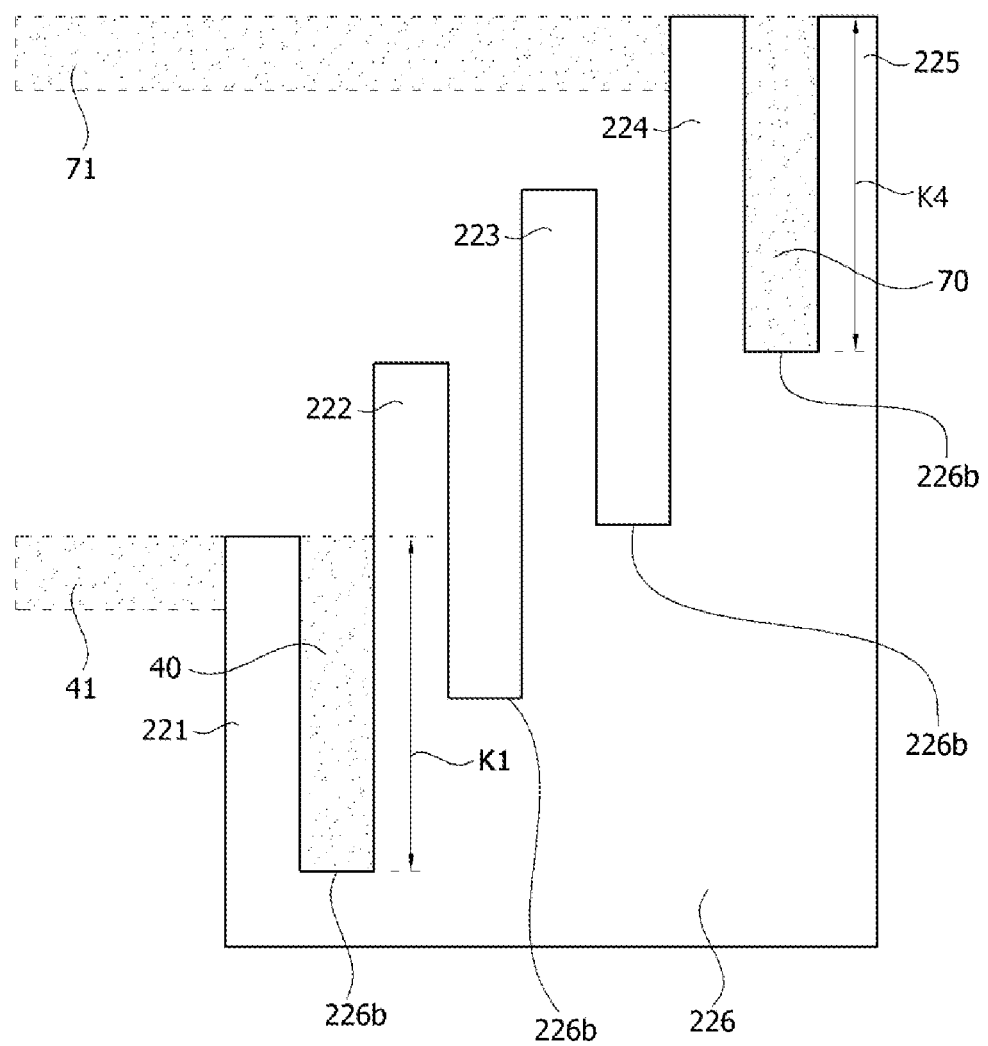

[FIG. 11]
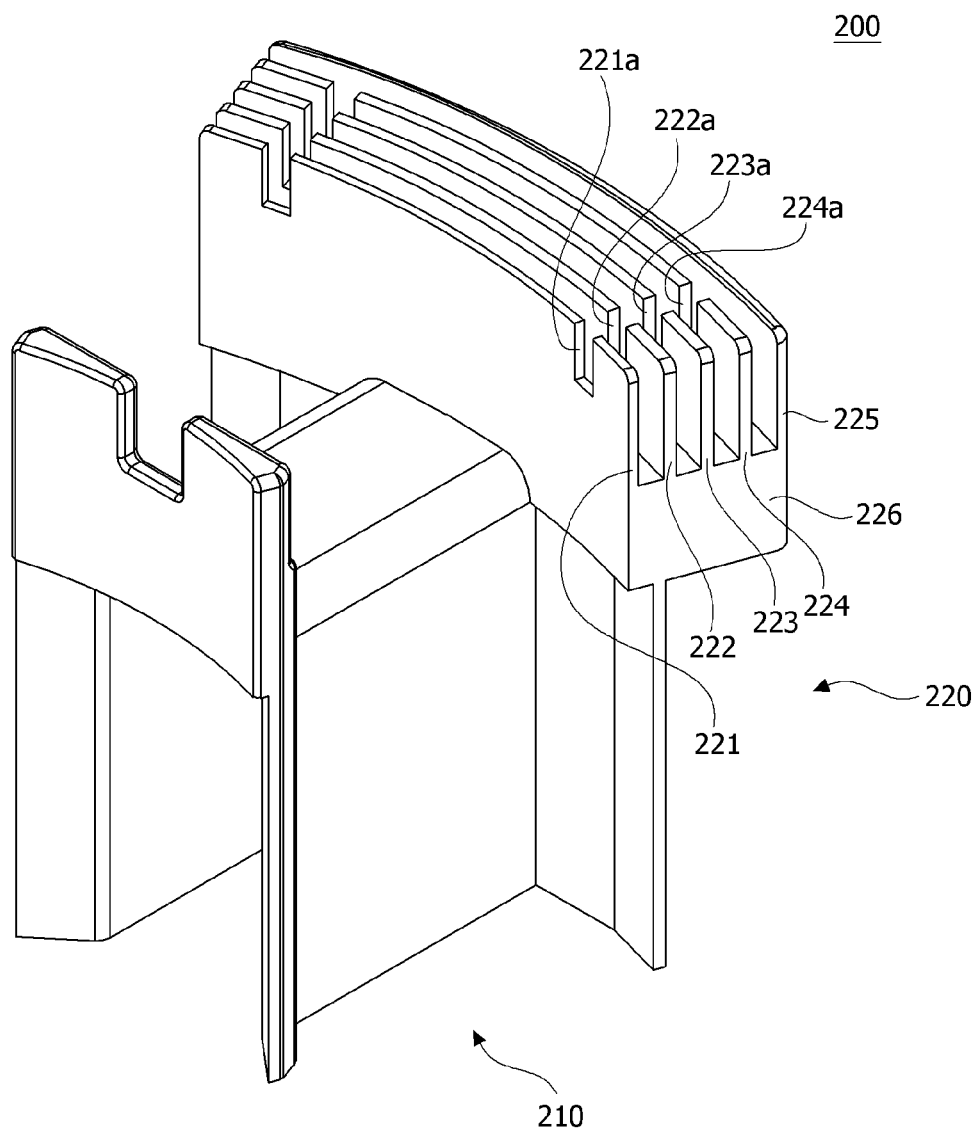

[FIG. 12]
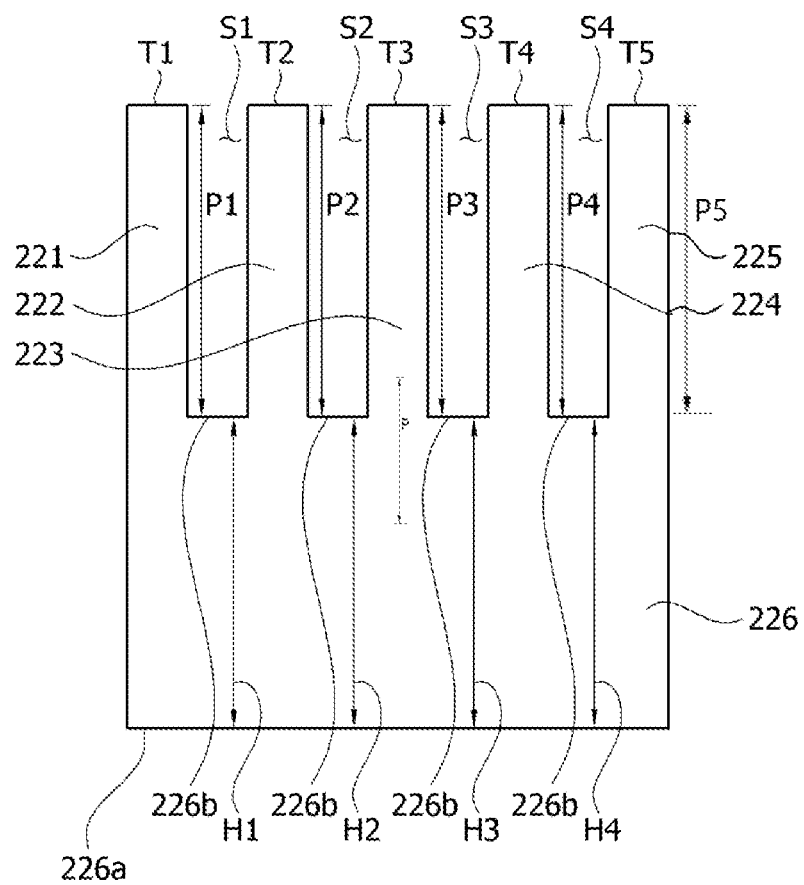

[FIG. 13]
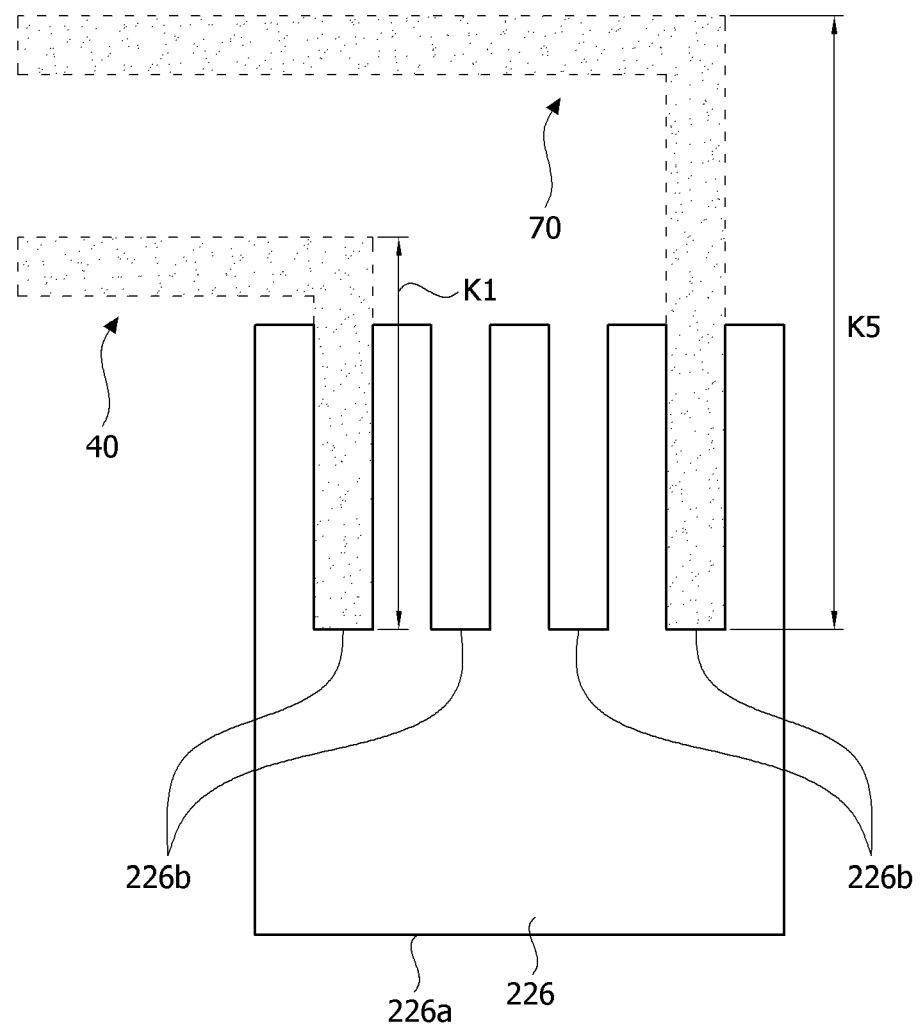

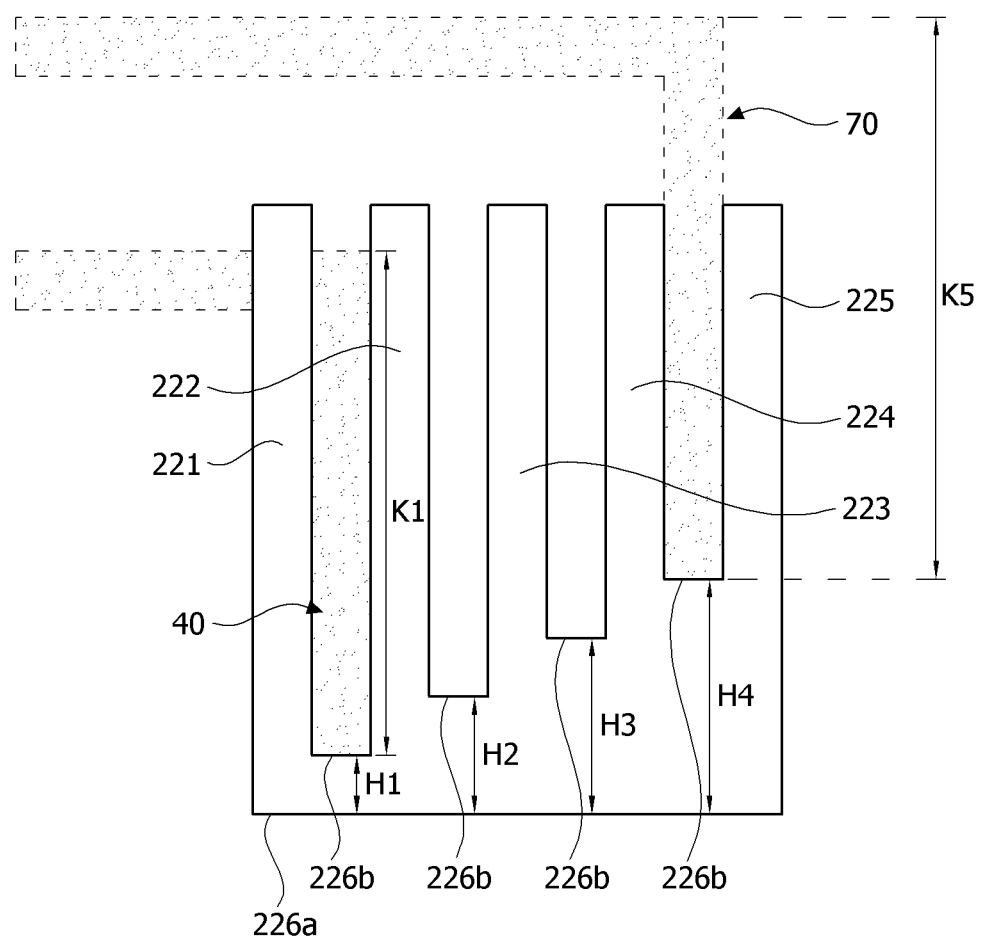
[FIG. 14]

MOTOR HAVING INSULATOR ON WHICH TERMINALS ARE SEATED

CROSS-REFERENCE TO RELATED PATENT APPLICATIONS

This application is a U.S. National Stage Application under 35 U.S.C. § 371 of PCT Application No. PCT/KR2020/018995, filed Dec. 23, 2020, which claims priority to Korean Patent Application No. 10-2020-0002746, filed Jan. 8, 2020, whose entire disclosures are hereby incorporated by reference.

TECHNICAL FIELD

The present invention relates to a motor.

BACKGROUND ART

A motor includes a rotor and a stator. A coil is wound around the stator. A connection end of the coil wound around the stator may be connected to a busbar. The busbar may be disposed on the stator.

The busbar includes a busbar body and a terminal. The terminal may be electrically connected to the connection end of the coil. The busbar body is formed of a plastic resin and is an annular member. The busbar body may be a mold member formed by being injection-molded with the terminal.

However, there is inconvenience of aligning positions of the busbar and the stator. That is, a connection end of the terminal of the busbar and an end portion of the coil wound around the stator should be aligned. In addition, unlike an insulator, since a support structure of the busbar is weak, there is a high risk of the busbar being moved by an external force. In addition, since the busbar body is a provided as a separate part, the number of parts increases, the number of assembly processes increases, and thus there is a problem that it is difficult to manage.

DISCLOSURE

Technical Problem

The present invention is directed to providing a motor which allows coils wound around a stator to be connected to an external power source without a busbar body.

Objectives to be solved by the present invention are not limited to the above-described objectives, and other objectives which are not described above will be clearly understood by those skilled in the art through following descriptions.

Technical Solution

One aspect of the present invention provides a motor including a stator core, an insulator coupled to the stator core, and a first terminal and a second terminal which are coupled to the insulator, wherein the stator core includes a yoke and a tooth protruding from the yoke, the insulator includes a body on which the tooth is disposed and a seating part extending from the body and disposed on the yoke, the seating part includes a base and a first partition wall, a second partition wall, and a third partition wall which extend from the base, the first terminal is disposed between the first partition wall and the second partition wall, and the second terminal is disposed between the second partition wall and the third partition wall.

The first terminal may include a body and a terminal part extending from the body, and the terminal part of the first terminal may extend toward the body of the insulator.

The first partition wall may include a groove coupled to the terminal part of the first terminal.

The seating part may include a fourth partition wall and a fifth partition wall which extend from the base, a third terminal may be disposed between the third partition wall and the fourth partition wall, a fourth terminal may be disposed between the fourth partition wall and the fifth partition wall, and each of the first to the fourth terminals may include a body and a terminal part extending from the body toward the body of the insulator.

Based on an upper surface of the base, heights of the first to fifth partition walls may be the same.

Based on a lower surface of the base, heights of upper surfaces of the base on which the first to fifth partition walls are formed may be different from each other.

Heights of the bodies of the first terminal to the fourth terminal and the terminal parts may be different from each other based on upper surfaces the base.

Based on a lower surface of the base, a height of the upper surface of the base on which the fifth partition wall is formed may be greater than a height of the upper surface of the base on which the first partition wall is formed.

The first partition wall may include a groove coupled to the terminal part of the first terminal, the second partition wall may include a groove coupled to the terminal part of the second terminal, the third partition wall may include a groove coupled to the terminal part of the third terminal, and the fourth partition wall may include a groove coupled to the terminal part of the fourth terminal.

The first partition wall may be disposed closer to the body of the insulator than the fifth partition wall, and the first terminal may be a neutral terminal.

At least one of the groove of the first partition wall, the groove of the second partition wall, the groove of the third partition wall, and the groove of the fourth partition wall may not overlap in a radial direction from a center of the stator core.

The groove of the second partition wall, the groove of the third partition wall, and the groove of the fourth partition wall may overlap in the radial direction from the center of the stator core.

Another aspect of the present invention provides a motor including a stator core, an insulator coupled to the stator core, a coil disposed around the insulator, and a terminal portion coupled to the insulator, wherein the insulator includes a body around which the coil is wound and a seating part which extends from the body and on which the terminal portion is disposed, the terminal portion includes a phase terminal and a neutral terminal, the phase terminal and the neutral terminal are disposed apart from each other on the seating part, one end of the coil is connected to the phase terminal, and the other end of the coil is connected to the neutral terminal.

The neutral terminal may be disposed closer to the body of the insulator than the phase terminal.

The phase terminal and the neutral terminal may each include a body and a terminal part extending from the body and coupled to the coil, and a length of the terminal part of the phase terminal in a radial direction may be smaller than a length of the terminal part of the neutral terminal in the radial direction.

Still another aspect of the present invention provides a motor including a stator core, an insulator coupled to the stator core, a coil disposed around the insulator, and a terminal portion coupled to the insulator, wherein the insulator includes a body around which the coil is wound and a seating part which extends from the body and on which the terminal portion is disposed, the terminal portion includes a first terminal and a second terminal, the seating part includes a first groove in which the first terminal is disposed and a second groove in which the second terminal is disposed, and heights of bottom surfaces of the first groove and the second groove based on a lower surface of the seating part are different from each other.

Advantageous Effects

According to embodiments, there is an advantage that coils wound around a stator can be connected to an external power source without a busbar body.

According to embodiments, there is an advantage that connection ends of the coils wound around the stator and terminals connecting the coils are easily aligned.

According to embodiments, since the busbar body is removed, there are advantages that the number of components decreases, and it is easy to assemble and manage.

DESCRIPTION OF DRAWINGS

FIG. 1 is a view illustrating a motor according to an embodiment.

FIG. 2 is a view illustrating a stator core and an insulator.

FIG. 3 is a view illustrating an insulator according to a first embodiment.

FIGS. 4 and 5 are side views illustrating a seating part of the insulator.

FIG. 6 is a view illustrating a terminal installed on the insulator.

FIG. 7 is an enlarged view illustrating region A of FIG. 6.

FIG. 8 is an enlarged view illustrating region B of FIG. 6.

FIG. 9 is an enlarged view illustrating region C of FIG. 6.

FIG. 10 is a side view illustrating the seating part in a state of FIG. 7.

FIG. 11 is a view illustrating an insulator according to a second embodiment.

FIG. 12 is a side view illustrating a seating part of the insulator illustrated in FIG. 11.

FIG. 13 is a view illustrating a state in which a first terminal and a fourth terminal are coupled to the seating part of the insulator illustrated in FIG. 11.

FIG. 14 is a side view illustrating the seating part in which upper surfaces of a base is formed to be stepped.

MODES OF THE INVENTION

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a view illustrating a motor according to an embodiment.

Referring to FIG. 1, the motor according to the embodiment may include a shaft 10, a rotor 20, a stator 30, and a housing 1. Hereinafter, the term "inward" refers to a direction from the housing 1 toward the shaft 10 which is located at a center of the motor, and the term "outward" refers to a direction opposite to "inward," that is, a direction from the shaft 10 toward the housing 1. In addition, a circumferential direction or a radial direction is defined based on an axial center.

The shaft 10 may be coupled to the rotor 20. When an electromagnetic interaction occurs between the rotor 20 and the stator 30 due to the supply of a current, the rotor 20 rotates, and the shaft 10 rotates in conjunction with the rotor 20.

The rotor 20 rotates through an electrical interaction with the stator 30. The rotor 20 may be disposed to correspond to the stator 30 and disposed inside the stator 30. The rotor 20 may include magnets.

The stator 30 is disposed outside the rotor 20. The stator 30 may include a stator core 100, an insulator 200, and coils 300. The insulator 200 is installed on the stator core 100. The coils 300 may be wound around the insulator 200. The insulator 200 is disposed between the coils 300 and the stator core 100 to serve to electrically insulate the stator core 100 from the coils 300. The coils 300 induce an electrical interaction with the magnets of the rotor 20.

FIG. 2 is a view illustrating the stator core 100 and the insulator 200.

Referring to FIG. 2, the insulator 200 may include an upper insulator 200A and a lower insulator 200B. The upper insulator 200A may be disposed at one side of the stator core 100. The lower insulator 200B may be disposed at the other side of the stator core 100. The upper insulator 200A and the lower insulator 200B may have the same shape and size. Hereinafter, features of the insulator 200 will be described based on the upper insulator 200A.

The stator core 100 may include a yoke 110 and a tooth 120. The tooth 120 may protrude from an inner circumferential surface of the yoke 110. The tooth 120 may be provided as a plurality of teeth 120. The number of the teeth 120 may be variously changed to correspond to the number of the magnets. The stator core 100 may be formed by coupling a plurality of divided cores each including the yoke 110 and the tooth 120.

FIG. 3 is a view illustrating an insulator 200 according to a first embodiment.

Referring to FIG. 3, coils 300 are wound around the insulator 200, and terminals 40, 50, 60, and 70 connected to the coils 300 are also seated on the insulator 200. The terminals 40, 50, 60, and 70 are seated on the insulator 200 without a busbar body. The insulator 200 may include a body 210 and a seating part 220. The body 210 is a part around which the coil 300 is wound and disposed on a tooth 120 of a stator core 100. The seating part 220 extends outward from the body 210. The seating part 220 is disposed on a yoke 110 of the stator core 100. The seating part 220 is a part on which the terminals 40, 50, 60, and 70 are seated.

The seating part 220 may include a base 226 and partition walls 221, 222, 223, 224, and 225. The partition walls 221, 222, 223, 224, and 225 may include a first partition wall 221, a second partition wall 222, a third partition wall 223, a fourth partition wall 224, and a fifth partition wall 225 in order from an inner side to an outer side. Accordingly, the first partition wall 221, the second partition wall 222, the third partition wall 223, the fourth partition wall 224, and the fifth partition wall 225 may be disposed close to the body 210 of the insulator 200 in that order.

The first partition wall 221 to the fifth partition wall 225 protrude from the base 226. The first partition wall 221 to the fifth partition wall 225 may be disposed apart from each other.

A groove 221a is disposed in the first partition wall 221, and the groove 221a may be concavely formed in an upper end of the first partition wall 221. In addition, the groove 221a may be disposed to pass through the first partition wall 221 from an inner surface to an outer surface thereof.

A groove 222a is disposed in the second partition wall 222, and the groove 222a may be concavely formed in an upper end of the second partition wall 222. In addition, the groove 222a may be formed to pass from an inner surface to an outer surface of the second partition wall 222.

A groove 223a is disposed in the third partition wall 223. The groove 223a may be concavely formed in an upper end of third partition wall 223. In addition, the groove 223a may be disposed to pass through the third partition wall 223 from an inner surface to an outer surface thereof.

A groove 224a is disposed in the fourth partition wall 224. The groove 224a may be concavely formed in an upper end of the fourth partition wall 224. In addition, the groove 224a may be disposed to pass through the fourth partition wall 224 from an inner surface to an outer surface thereof.

At least one of the grooves 221a, 222a, 223a, and 224a may be disposed not to overlap in a radial direction from a center of the stator core 100. However, the groove 222a of the second partition wall 222, the groove 223a of the third partition wall 223, and the groove 224a of the fourth partition wall 224 may be disposed to overlap in the radial direction from the center of the stator core 100.

FIGS. 4 and 5 are side views illustrating the seating part 220 of the insulator 200.

Referring to FIG. 4, a height P1 of the first partition wall 221, a height P2 of the second partition wall 222, a height P3 of the third partition wall 223, a height P4 of the fourth partition wall 224, and a height P5 of the fifth partition wall 225 may all be the same. In this case, the heights P1 to P5 may be straight distances from upper surfaces 226b of the base 226 from which the partition walls 221, 222, 223, 224, and 225 protrude to the upper ends of the partition walls 221, 222, 223, 224, and 225.

Referring to FIG. 5, based on a lower surface 226a of the base 226, heights H1 to H4 of the upper surfaces 226b of the base 226 on which the first partition wall 221 to the fifth partition wall 225 are formed may all be different from each other. Accordingly, the upper surfaces 226b of the base 226 on which the first partition wall 221 to the fifth partition wall 225 are formed may be formed to be stepped.

A first groove S1 is formed between the first partition wall 221 and the second partition wall 222. A first terminal 40 is disposed in the first groove S1. A second groove S2 is formed between the second partition wall 222 and the third partition wall 223. A second terminal 50 is disposed in the second groove S2. A third groove S3 is formed between the third partition wall 223 and the fourth partition wall 224. A third terminal 60 is disposed in the third groove S3. A fourth groove S4 is formed between the third partition wall 223 and the fourth partition wall 224. A fourth terminal 70 is disposed in the fourth groove S4.

Meanwhile, a height H1 of a bottom surface of the first groove S1, a height H2 of a bottom surface of the second groove S2, a height H3 of a bottom surface of the third groove S3, and a height H4 of a bottom surface of the fourth groove S4 may all be different from each other. In this case, the heights P1 to P4 of the bottom surfaces of the first to fourth grooves S1 to S4 are heights of the upper surfaces 226b of the base 226 on which the first partition wall 221 to the fifth partition wall 225 are formed based on the lower surface 226a of the base 226.

FIG. 6 is a view illustrating the terminal 40, 50, 60, and 70 installed on the insulator 200.

Referring to FIG. 6, the first terminal 40, the second terminal 50, the third terminal 60, and the fourth terminal 70 may be seated on the insulator 200. The first terminal 40, the second terminal 50, and the third terminal 60 may be phase terminals connected to U-, V-, and W-phase power sources, and the fourth terminal 70 may be a neutral terminal.

The first terminal 40, the second terminal 50, the third terminal 60, and the fourth terminal 70 may be disposed in order from an inner side to an outer side.

The first terminal 40 includes a plurality of terminal parts 41, and the terminal parts 41 extend inward and are positioned between bodies 210 of adjacent insulators 200.

The second terminal 50 includes a plurality of terminal parts 51, and the terminal parts 51 extend inward and are positioned between the bodies 210 of the adjacent insulators 200.

The third terminal 60 includes a plurality of terminal part 61, the terminal parts 61 extend inward and are positioned between the bodies 210 of the adjacent insulators 200.

The fourth terminal 70 includes a plurality of terminal part 71, and the terminal parts 71 extend inward and are positioned between the bodies 210 of the adjacent insulators 200.

FIG. 7 is an enlarged view illustrating region A of FIG. 6.

Referring to FIG. 7, based on any one of the plurality of insulators 200, the first terminal 40 is disposed between the first partition wall 221 and the second partition wall 222. The terminal part 41 of the first terminal 40 may be coupled to the groove 221a of the first partition wall 221. The terminal part 41 may pass through the groove 221a and be positioned inside the seating part 220 of the insulator 200. An end of the terminal part 41 may be formed to be bent in a direction away from the body 210 of the insulator 200.

In addition, the fourth terminal 70 is disposed between fourth partition wall 224 and the fifth partition wall 225. The terminal part 71 of the fourth terminal 70 may be coupled to the groove 224a of the fourth partition wall 224. The terminal part 71 may pass through the groove 224a and be positioned inside the seating part 220 of the insulator 200. An end of the terminal part 71 may be formed to be bent in a direction away from the body 210 of the insulator 200.

Meanwhile, a length R1 of the terminal part 41 of the first terminal 40 in the radial direction may be greater than a length R4 of the terminal part 71 of the fourth terminal 70 in the radial direction. This is because the fourth terminal 70 is disposed outside the first terminal 40.

The terminal part 41 of the first terminal 40 which is the phase terminal may be connected to one end portion 310 of the coil 300. In addition, the terminal part 71 of the fourth terminal 70 which is the neutral terminal may be connected to the other end portion 320 of the coil 300.

FIG. 8 is an enlarged view illustrating region B of FIG. 6.

Referring to FIG. 8, the insulator 200 illustrated in FIG. 8 is the insulator 200 adjacent to the insulator 200 illustrated in FIG. 7. Based on the insulator 200 illustrated in FIG. 8, the second terminal 50 is disposed between the second partition wall 222 and the third partition wall 223. The terminal part 51 of the second terminal 50 may be coupled to the groove 222a of the second partition wall 222. The terminal part 51 may pass through the groove 222a and be positioned inside the seating part 220 of the insulator 200. An end of the terminal part 51 may be formed to be bent in a direction away from the body 210 of the insulator 200.

In addition, the fourth terminal 70 is disposed between the fourth partition wall 224 and the fifth partition wall 225. The terminal part 71 of the fourth terminal 70 may be coupled to the groove 224a of the fourth partition wall 224. The terminal part 71 may pass through the groove 224a and be positioned inside the seating part 220 of the insulator 200. An end of the terminal part 71 may be formed to be bent in a direction away from the body 210 of the insulator 200.

In addition, the first terminal 40 may be disposed between the first partition wall 221 and the second partition wall 222 without the terminal part 41.

Meanwhile, a length R4 of the terminal part 71 of the fourth terminal 70 in the radial direction may be greater than a length R2 of the terminal part 41 of the second terminal 50 in the radial direction. This is because the fourth terminal 70 is disposed outside the second terminal 50. The length R2 of the terminal part 41 of the second terminal 50 in the radial direction is greater than a length R1 of the terminal part 41 of the first terminal 40 in the radial direction. This is because the second terminal 50 is disposed outside the first terminal 40.

The terminal part 51 of the second terminal 50 which is the phase terminal may be connected to one end portion 310 of the coil 300. In addition, the terminal part 71 of the fourth terminal 70 which is the neutral terminal may be connected to the other end portion 320 of the coil 300.

FIG. 9 is an enlarged view illustrating region C of FIG. 6.

Referring to FIG. 9, the insulator 200 illustrated in FIG. 9 is the insulator 200 adjacent to the insulator 200 illustrated in FIG. 7. Based on the insulator 200 illustrated in FIG. 9, the third terminal 60 is disposed between the third partition wall 223 and the fourth partition wall 224. The terminal part 61 of the third terminal 60 may be coupled to the groove 223a of the third partition wall 223. The terminal part 61 may pass through the groove 223a and be positioned inside the seating part 220 of the insulator 200. An end of the terminal part 61 may be formed to be bent in a direction away from the body 210 of the insulator 200.

In addition, the fourth terminal 70 is disposed between the fourth partition wall 224 and the fifth partition wall 225. The terminal part 71 of the fourth terminal 70 may be coupled to the groove 224a of the fourth partition wall 224. The terminal part 71 may pass through the groove 224a and be positioned inside the seating part 220 of the insulator 200. An end of the terminal part 71 may be formed to be bent in a direction away from the body 210 of the insulator 200.

Meanwhile, a length R4 of the terminal part 71 of the fourth terminal 70 in the radial direction may be greater than a length R3 of the terminal part 61 of the third terminal 60 in the radial direction. This is because the fourth terminal 70 is disposed outside the third terminal 60. The length R3 of the terminal part 61 of the third terminal 60 in the radial direction is greater than a length R2 of the terminal part 51 of the second terminal 50 in the radial direction. This is because the third terminal 60 is disposed outside the second terminal 50.

The terminal part 61 of the third terminal 60 which is the phase terminal may be connected to one end portion 310 of the coil 300. In addition, the terminal part 71 of the fourth terminal 70 which is the neutral terminal may be connected to the other end portion 320 of the coil 300.

FIG. 10 is a side view illustrating the seating part 220 in a state of FIG. 7.

Referring to FIG. 10, although a height K1 of the first terminal 40 and a height K4 of the fourth terminal 70 are the same, since the upper surface 226b of the base 226 on which the first partition wall 221 is positioned is disposed to be stepped from the upper surface 226b of the base 226 on which the fifth partition wall 225 is positioned, even when there is a region in which the first terminal 40 and the fourth terminal 70 overlap in the radial direction, a level of the terminal part 41 of the first terminal 40 and a level of the terminal part 71 of the fourth terminal 70 are different from each other.

FIG. 11 is a view illustrating an insulator 200 according to a second embodiment, and FIG. 12 is a side view illustrating a seating part 220 of the insulator 200 illustrated in FIG. 11.

Referring to FIGS. 11 and 12, in the seating part 220 of the insulator 200 according to the second embodiment, a position of an upper end T1 of a first partition wall 221, a position of an upper end of T2 of a second partition wall 222, a position of an upper end T3 of a third partition wall 223, a position of an upper end T4 of a fourth partition wall 224, and a position of an upper end T5 of a fifth partition wall 225 may all be the same. In addition, based on a lower surface 226a of a base 226, heights H1 to H4 of upper surfaces 226b of the base 226 on which the first partition wall 221 to the fifth partition wall 225 are formed may all be the same. Accordingly, the upper surfaces 226b of the base 226 on which the first partition wall 221 to fifth partition wall 225 are formed to be coplanar with each other. In addition, a height P1 of the first partition wall 221, a height P2 of the second partition wall 222, a height P3 of the third partition wall 223, a height P4 of the fourth partition wall 224, and a height P5 of the fifth partition wall 225 may all be the same. In this case, a height may each be a straight distance from the upper surfaces 226b of the base 226 from which the partition walls 221, 222, 223, 224, and 225 protrude to the upper end T1 to T5 of the partition walls 221, 222, 223, 224, and 225.

FIG. 13 is a view illustrating a state in which a first terminal 40 and a fourth terminal 70 are coupled to the seating part 220 of the insulator 200 illustrated in FIG. 11.

Referring to FIG. 13, based on the lower surface 226a of the abase 226, since the heights of the upper surface 226b of the base 226 on which the first partition wall 221 to the fifth partition wall 225 are formed are all the same, heights of first to fourth terminals 70 may be different from each other based on the upper surface 226b of the base 226 so that the terminals 40, 50, 60, and 70 may be stepped. For example, a height K5 of the second terminal 50 may be greater than a height K1 of the first terminal 40.

FIG. 14 is a side view illustrating a seating part 220 in which upper surfaces 226b of a base 226 are formed to be stepped.

Referring to FIG. 14, in a state in which a position of an upper end T1 of a first partition wall 221, a position of an upper end T2 of a second partition wall 222, a position of an upper end T3 of a third partition wall 223, a position of an upper end T4 of a fourth partition wall 224, and a position of an upper end T5 of a fifth partition wall 225 are all the same, based on a lower surface 226a of the base 226, heights H1 to H4 of the upper surfaces 226b of the base 226 on which the first partition wall 221 to the fifth partition wall 225 are formed may be different from each other. Accordingly, even when the heights of the first terminal to the fourth terminal 70 are all the same, steps between the terminals 40, 50, 60, and 70 may be formed.

The motor according to one exemplary embodiment of the present has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:
1. A motor comprising:
a stator core;
an insulator coupled to the stator core; and
a plurality of terminals connected to a coil,
wherein the insulator includes a body around which the coil is wound, and a seating part extending from the body,
wherein the seating part includes a base and a plurality of partition walls that protrude from the base in an axial direction and are radially spaced apart,
wherein the plurality of terminals are disposed between the partition walls, and penetrates at least one partition wall, such that an end of the plurality of terminals is positioned inside the seating part,
wherein an upper surface of the base is formed to be stepped and becomes higher as it faces outward in a radial direction.

2. The motor of claim 1,
wherein the plurality of partition walls includes a groove,
wherein the groove is concavely formed at an upper end of the plurality of partition walls, and
wherein a terminal part of the terminal is coupled to the groove.

3. The motor of claim 2, wherein
the groove includes a plurality of grooves respectively disposed in different ones of the partition walls to overlap each other in a radial direction.

4. The motor of claim 1, wherein heights of the plurality of partition walls are the same.

5. The motor of claim 1, wherein the plurality of terminals includes a phase terminal and a neutral terminal,
the phase terminal and the neutral terminal are disposed apart from each other on the seating part,
one end of the coil is connected to the phase terminal, and
the other end of the coil is connected to the neutral terminal.

6. The motor of claim 5, wherein the phase terminal is disposed closer to the body of the insulator than the neutral terminal.

7. The motor of claim 5, wherein:
each of the phase terminal and the neutral terminal includes a body and a terminal part extending from the body and coupled to the coil; and
a length of the terminal part of the neutral terminal in a radial direction is smaller than a length of the terminal part of the phase terminal in the radial direction.

8. The motor of claim 1, wherein the end of the plurality of terminals are positioned between the bodies of the insulators.

* * * * *